United States Patent
Wang et al.

(10) Patent No.: US 11,509,638 B2
(45) Date of Patent: Nov. 22, 2022

(54) RECEIVE-SIDE PROCESSING FOR ENCAPSULATED ENCRYPTED PACKETS

(71) Applicant: VMware, Inc., Palo Alto, CA (US)

(72) Inventors: Yong Wang, San Jose, CA (US); Jochen Behrens, Santa Cruz, CA (US)

(73) Assignee: VMWARE, INC., Palo Alto, CA (US)

( * ) Notice: Subject to any disclaimer, the term of this patent is extended or adjusted under 35 U.S.C. 154(b) by 338 days.

(21) Appl. No.: 16/714,838

(22) Filed: Dec. 16, 2019

(65) Prior Publication Data

US 2021/0185025 A1 Jun. 17, 2021

(51) Int. Cl.
*H04L 9/40* (2022.01)
*G06F 9/50* (2006.01)
*G06F 9/455* (2018.01)

(52) U.S. Cl.
CPC ...... *H04L 63/0485* (2013.01); *G06F 9/45558* (2013.01); *G06F 9/505* (2013.01); *G06F 9/5077* (2013.01); *G06F 2009/45595* (2013.01)

(58) Field of Classification Search
CPC ..... H04L 63/0485; H04L 49/70; H04L 45/64; H04L 45/7453; H04L 63/0478;
(Continued)

(56) References Cited

U.S. PATENT DOCUMENTS 6,901,452 B1 5/2005 Bertagna
6,968,441 B1 11/2005 Schnee
(Continued)

FOREIGN PATENT DOCUMENTS

CN 102801695 A 11/2012
CN 108540559 A 9/2018
(Continued)

OTHER PUBLICATIONS

Joongi Kim et al., "NBA (Network Balancing Act): A High-performance Packet Processing Framework for Heterogeneous Processors", KAIST, Apr. 21-25, 2015, pp. 14.
(Continued)

*Primary Examiner* — Robert B Leung
*Assistant Examiner* — Bruce S Ashley
(74) *Attorney, Agent, or Firm* — Su IP Consulting (57) ABSTRACT

Example methods and computer systems for receive-side processing for encapsulated encrypted packets. One example may comprise: in response to receiving, over a tunnel, a first encapsulated encrypted packet that includes a first encrypted inner packet and a first outer header, generating a first decrypted inner packet by performing decryption and decapsulation; and based on content of the first decrypted inner packet, assigning the first decrypted inner packet to a first processing unit. The method may further comprise: in response to receiving, over the tunnel, a second encapsulated encrypted packet that includes a second encrypted inner packet and a second outer header, generating a second decrypted inner packet by performing decryption and decapsulation; and based on content of the second decrypted inner packet, assigning the second decrypted inner packet to a second processing unit, thereby distributing post-cryptography processing over multiple processing units.

21 Claims, 6 Drawing Sheets

(58) Field of Classification Search
CPC .... G06F 9/45558; G06F 9/505; G06F 9/5077; G06F 2009/45595
See application file for complete search history.

(56) References Cited

U.S. PATENT DOCUMENTS

| | | | |
|---|---|---|---|
| 7,003,118 B1 | 2/2006 | Yang et al. | |
| 7,181,612 B1 | 2/2007 | Pellacuru et al. | |
| 7,243,225 B2 | 7/2007 | Poeluev et al. | |
| 7,555,544 B1 | 6/2009 | Rattner et al. | |
| 7,814,310 B2 | 10/2010 | Bouchard et al. | |
| 7,962,358 B1 | 6/2011 | Fernandez et al. | |
| 8,175,078 B2 | 5/2012 | Voit et al. | |
| 8,356,346 B2 | 1/2013 | Datta et al. | |
| 8,547,837 B2 | 10/2013 | Ronciak et al. | |
| 9,483,286 B2 | 11/2016 | Basavaiah et al. | |
| 9,535,750 B1 | 1/2017 | Wilkes et al. | |
| 9,588,813 B1 | 3/2017 | Dubey et al. | |
| 9,674,088 B1 | 6/2017 | Sivaramakrishnan et al. | |
| 9,712,460 B1 | 7/2017 | Friend | |
| 9,755,972 B1 | 9/2017 | Mao et al. | |
| 9,929,970 B1 | 3/2018 | Matthews et al. | |
| 10,020,984 B1 | 7/2018 | Jork et al. | |
| 10,257,167 B1 | 4/2019 | Matthews et al. | |
| 10,498,529 B1* | 12/2019 | Hashmi | H04L 9/0618 |
| 10,498,708 B2 | 12/2019 | Wang et al. | |
| 10,623,372 B2 | 4/2020 | Wang et al. | |
| 10,701,107 B2 | 6/2020 | Gopal et al. | |
| 2002/0097724 A1 | 7/2002 | Halme et al. | |
| 2003/0088787 A1 | 5/2003 | Egevang | |
| 2004/0143734 A1 | 7/2004 | Buer et al. | |
| 2004/0225895 A1 | 11/2004 | Mukherjee et al. | |
| 2005/0198531 A1 | 9/2005 | Kaniz et al. | |
| 2005/0213603 A1 | 9/2005 | Karighattam et al. | |
| 2006/0002388 A1 | 1/2006 | Grebus et al. | |
| 2007/0130352 A1 | 6/2007 | Chhabra et al. | |
| 2008/0123593 A1 | 5/2008 | Fujita et al. | |
| 2008/0144625 A1 | 6/2008 | Wu et al. | |
| 2008/0165964 A1 | 7/2008 | Lewis et al. | |
| 2008/0307024 A1 | 12/2008 | Michaels et al. | |
| 2009/0199290 A1 | 8/2009 | McCullough et al. | |
| 2009/0287848 A1 | 11/2009 | Kamura et al. | |
| 2010/0153715 A1 | 6/2010 | Kauppinen et al. | |
| 2010/0191958 A1 | 7/2010 | Chen | |
| 2010/0217949 A1 | 8/2010 | Schopp et al. | |
| 2011/0113236 A1 | 5/2011 | Chenard et al. | |
| 2011/0153985 A1 | 6/2011 | Saha et al. | |
| 2012/0027314 A1 | 2/2012 | Lee et al. | |
| 2012/0102278 A1 | 4/2012 | Joffray et al. | |
| 2012/0124591 A1 | 5/2012 | Cadambi et al. | |
| 2012/0170459 A1 | 7/2012 | Olesinski et al. | |
| 2012/0254353 A1 | 10/2012 | Baba et al. | |
| 2013/0201989 A1 | 8/2013 | Hu et al. | |
| 2014/0089480 A1 | 3/2014 | Zhu | |
| 2014/0108665 A1 | 4/2014 | Arora et al. | |
| 2014/0313932 A1 | 10/2014 | Saltsidis | |
| 2015/0195138 A1 | 7/2015 | Horman | |
| 2015/0263974 A1 | 9/2015 | Jain et al. | |
| 2016/0057108 A1* | 2/2016 | Hu | H04L 47/762 726/15 |
| 2016/0085571 A1 | 3/2016 | Kim et al. | |
| 2016/0087888 A1 | 3/2016 | Jain et al. | |
| 2016/0088072 A1 | 3/2016 | Likhtarov et al. | |
| 2016/0092259 A1 | 3/2016 | Mehta et al. | |
| 2016/0142307 A1 | 5/2016 | Kamper et al. | |
| 2016/0182509 A1* | 6/2016 | Kantecki | H04L 63/0442 713/160 |
| 2016/0212098 A1 | 7/2016 | Roch | |
| 2016/0226815 A1 | 8/2016 | Wan et al. | |
| 2016/0277478 A1 | 9/2016 | Narasimhamurthy | |
| 2016/0352628 A1 | 12/2016 | Reddy et al. | |
| 2017/0005931 A1 | 1/2017 | Mehta et al. | |
| 2017/0024293 A1 | 1/2017 | Bell et al. | |
| 2017/0054603 A1 | 2/2017 | Kulkarni et al. | |
| 2017/0063808 A1 | 3/2017 | Manapragada et al. | |
| 2017/0063979 A1 | 3/2017 | Saeki | |
| 2017/0163598 A1 | 6/2017 | Shen et al. | |
| 2017/0374025 A1 | 12/2017 | Pan | |
| 2018/0054458 A1 | 2/2018 | Marck et al. | |
| 2018/0062875 A1 | 3/2018 | Tumuluru | |
| 2018/0067786 A1 | 3/2018 | Nguyen Trung et al. | |
| 2018/0069924 A1 | 3/2018 | Tumuluru et al. | |
| 2018/0123950 A1 | 5/2018 | Garg et al. | |
| 2018/0131521 A1 | 5/2018 | Yang et al. | |
| 2018/0191642 A1 | 7/2018 | Biederman et al. | |
| 2018/0241655 A1* | 8/2018 | Tsirkin | G06F 9/545 |
| 2018/0343146 A1 | 11/2018 | Dunbar et al. | |
| 2019/0114206 A1 | 4/2019 | Murugesan et al. | |
| 2019/0140984 A1 | 5/2019 | Agarwal et al. | |
| 2019/0173841 A1 | 6/2019 | Wang et al. | |
| 2019/0173850 A1 | 6/2019 | Jain et al. | |
| 2019/0173851 A1* | 6/2019 | Jain | H04L 9/088 |
| 2019/0173920 A1 | 6/2019 | Gopal et al. | |
| 2019/0190892 A1 | 6/2019 | Menachem et al. | |
| 2019/0266217 A1 | 8/2019 | Arakawa et al. | |
| 2019/0342266 A1 | 11/2019 | Ramachandran et al. | |
| 2020/0084192 A1 | 3/2020 | Wang et al. | |
| 2020/0099670 A1* | 3/2020 | Kessler | G06F 9/4881 |
| 2020/0120078 A1 | 4/2020 | Mao et al. | |
| 2020/0351254 A1 | 11/2020 | Xiong et al. | |
| 2020/0403922 A1 | 12/2020 | Yu et al. | |
| 2021/0020727 A1 | 1/2021 | Lin et al. | |
| 2021/0021523 A1 | 1/2021 | Wang et al. | |
| 2021/0400029 A1 | 12/2021 | Wang et al. | |

FOREIGN PATENT DOCUMENTS

| | | |
|---|---|---|
| CN | 110677426 A | 1/2020 |
| KR | 20030013496 A | 2/2003 |
| WO | 2016020727 A1 | 2/2016 |

OTHER PUBLICATIONS

Jeongseok Son et al., "Protego: Cloud-Scale Multitenant IPsec Gateway", in the proceedings of the 2017 USENIX annual technical conference, Jul. 12-14, 2017, pp. 15.
C. Hopps, Analysis of an Equal-Cost Multi-Path Algorithm:, Network Working Group—NextHop Technologies, Nov. 2000.
Cisco IOS XE Release 3S, "ECMP Load Balancing", MPLS: Layer 3 VPNs Configuration Guide, Cisco IOS XE Release 3S (Cisco ASR 900 Series), May 2018.
Jesper Dangaard Brouer, "[Net-next, V8, 0/5] New Bpf Cpumap Type for XDP_Redirect", Oct. 16, 2017, Retreived from Internet at <URL: http://patchwork.ozlabs.org/cover/826223/>.
Jeongseok Son et al., "Protego: Cloud-Scale Multitenant IPsec Gateway", The Proceedings of the 2017 USENIX Annual technical Conference, Jul. 12-14, 2017.
Shin Muramatsu et al., "VSE: Virtual Switch Extension for Adaptive CPU Core Assignment in Softirq", 2014 IEEE 6th International Conference on Cloud Computing Technology and Science, 2014, pp. 923-928.
Ying Ye et al., "MARACAS: A Real-Time Multicore VCPU Scheduling Framework", 2016 IEEE Real-Time Systems Symposium, 2016, pp. 179-190.
Antoine Kaufmann et al., "High Performance Packet Processing with FlexNIC", ASPLOS'16, Apr. 2-6, 2016.
"Receive Side Scaling (RSS) Guide by Microsoft", Apr. 19, 2017, <URL: https://docs.microsoft.com/en-us/windows-hardware/drivers/network/ndis-receive-side-scaling2>, pp. 3936.
Non-Published Commonly Owned U.S. Appl. No. 16/016,360, filed Jun. 22, 2018, 36 pages, VMware, Inc.
Non-Published Commonly Owned U.S. Appl. No. 16/802,580, filed Feb. 27, 2020, 31 pages, VMware, Inc.
Non-Published Commonly Owned U.S. Appl. No. 16/893,450, filed Jun. 5, 2020, 36 pages, VMware, Inc.
Non-Published Commonly Owned U.S. Appl. No. 17/016,596, filed Sep. 10, 2020, 36 pages, VMware, Inc.
Craig A. Shue et al., "IPSec: Performance Analysis and Enhancements", IEEE Communications Society subject matter experts for publication in the ICC 2007 proceedings, 2007, pp. 1527-1532.

(56) References Cited

OTHER PUBLICATIONS

Tudor Marian et al., "NetSlices: Scalable Multi-Core Packet Processing in User-Space", ANCS'12, Oct. 29-30, 2012.
Non-Published Commonly Owned U.S. Appl. No. 16/906,905, filed Jun. 19, 2020, 126 pages, VMware, Inc.
Ying Ye et al., "MARACAS: A Real-Time Multicore VCPU Scheduling Framework", 2016 IEEE Real=Time Systems Symposium (RTSS), Porto, 2016, 12 pages.
"VPN Setup Tutorial Guide", Internet-Computer-Security.com, Retrieved on May 1, 2019 at <URL: http://www.internet-computer-security.com/VPN-Guide/VPN-Tutorial-G>, 7 pages.
"IPsec VPN Overview", info_outline Platform and Release Support, Mar. 31, 2019, 25 pages.
International Search Report and Written Opinion of the International Searching Authority, International application No. PCT/US2022/011726, dated Apr. 8, 2022.
Elaine Barker et al., "Guide to IPsec VPNs", National Institute of Standards and Technology (NIST), Jun. 30, 2020, 166 pages, Retrieved from the Internte: URL <https://nvlpubs.nist.gov/nistpubs/SpecialPublications/NIST.SP.800-77rl.pdf/, Retrieved on Jun. 30, 2022, Section 3.

\* cited by examiner

RECEIVE-SIDE PROCESSING FOR ENCAPSULATED ENCRYPTED PACKETS

BACKGROUND

Virtualization allows the abstraction and pooling of hardware resources to support virtual machines in a Software-Defined Networking (SDN) environment, such as a Software-Defined Data Center (SDDC). For example, through server virtualization, virtual machines (VMs) running different operating systems may be supported by the same physical machine (e.g., referred to as a "host"). Each VM is generally provisioned with virtual resources to run an operating system and applications. Further, through SDN, benefits similar to server virtualization may be derived for networking services. For example, logical overlay networks may be provisioned, changed, stored, deleted and restored programmatically without having to reconfigure the underlying physical hardware architecture. In practice, network device(s) may be deployed in the SDN environment to perform packet processing to facilitate communication among endpoints, such as VMs, etc. However, existing approaches for processing encapsulated encrypted packets may lack efficiency.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Figure 1:
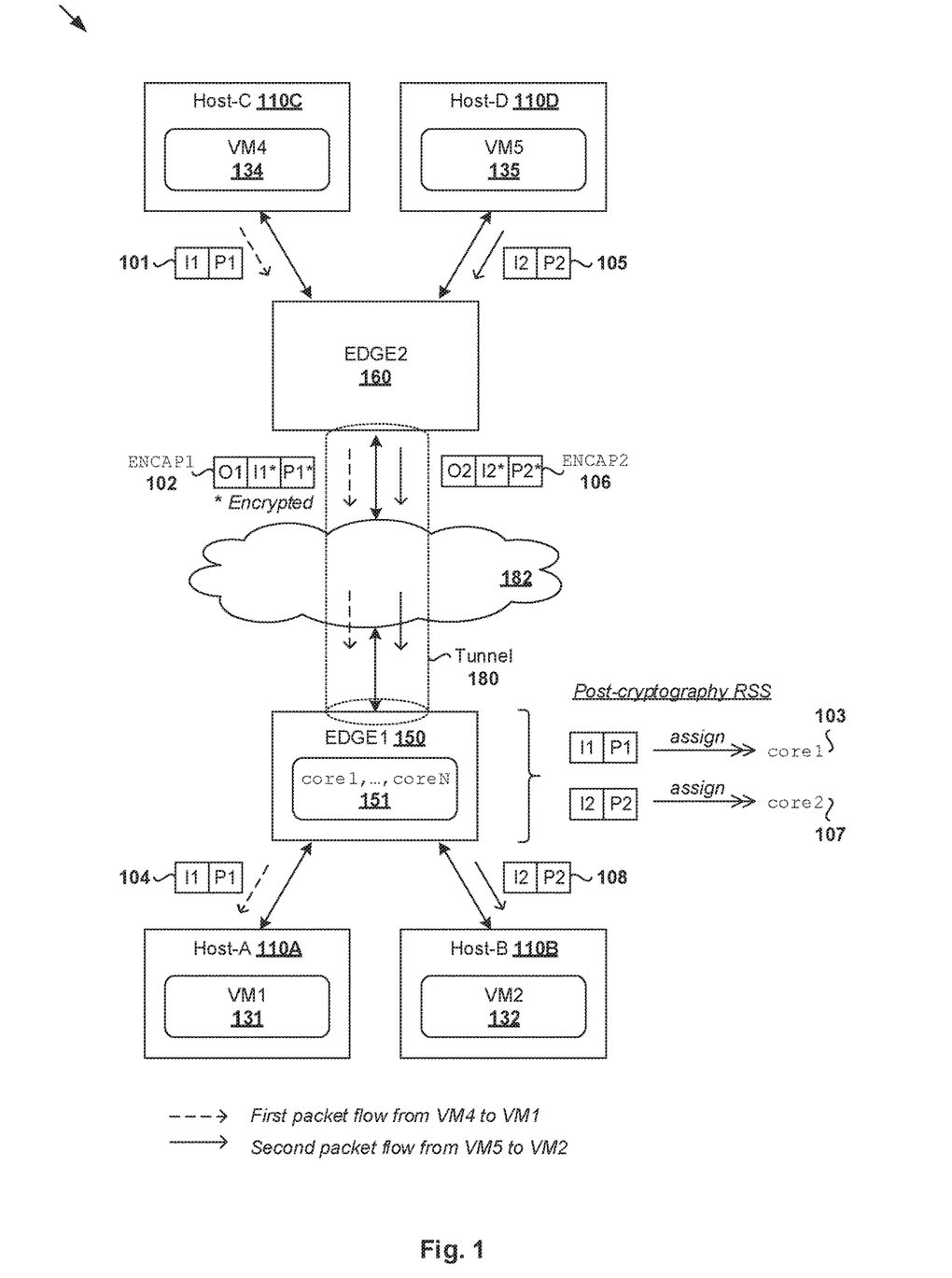
FIG. 1 is a schematic diagram illustrating an example software-defined networking (SDN) environment in which receive-side processing for encapsulated encrypted packets may be performed.
Figure 2:
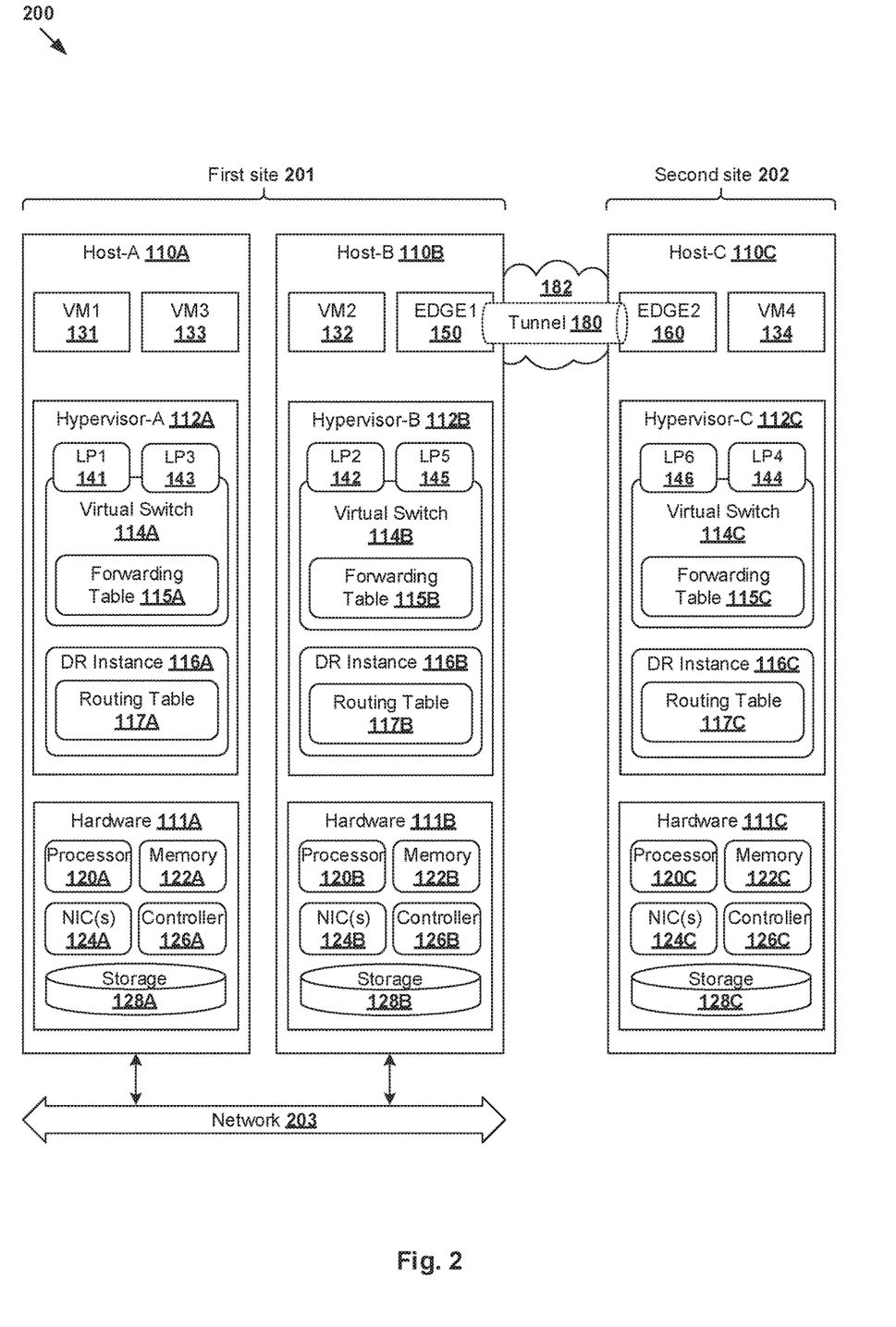
FIG. 2 is a schematic diagram illustrating an example physical view of the SDN environment in FIG. 1.

Challenges relating to packet processing will now be explained using FIG. 1 and FIG. 2. In particular, FIG. 1 is a schematic diagram illustrating example software-defined networking (SDN) environment 100 in which receive-side processing for encapsulated encrypted packets may be performed. FIG. 2 is a schematic diagram illustrating example physical view 200 of SDN environment 100 in FIG. 1. It should be understood that, depending on the desired implementation, SDN environment 100 may include additional and/or alternative components than that shown in FIG. 1 and FIG. 2. In practice, SDN environment 100 may include any number of hosts (also known as "computer systems," "computing devices", "host computers", "host devices", "physical servers", "server systems", "transport nodes," etc.). Each host may be supporting any number of virtual machines (e.g., tens or hundreds).

Referring first to FIG. 1, SDN environment 100 includes multiple hosts, such as host-A 110A, host-B 110B and host-C 110C. In practice, hosts 110A-C may be located at geographically dispersed sites, such hosts 110A-B at a first site and hosts 110C-D at a second site. To facilitate communication among hosts 110A-D over physical network 182, EDGE1 150 may be deployed at the edge of the first site, and EDGE2 160 at the edge of the second site. Throughout the present disclosure, EDGE 150/160 may be an entity that is implemented using one or more virtual machines (VMs) and/or physical machines (also known as "bare metal machines") and capable of performing functionalities of a switch, router, bridge, gateway, edge appliance, any combination thereof, etc. In practice, EDGE 150/160 may implement a centralized service router (SR) to provide networking services such as firewall, load balancing, network address translation (NAT), intrusion detection, deep packet inspection, etc.

Referring also to FIG. 2, EDGE1 150 ("first computer system") and EDGE2 160 ("second computer system") may be VMs supported by respective host-B 110B and host-C 110C. Hosts 110A-C may each include suitable hardware and virtualization software (e.g., hypervisors 112A-C) to support various VMs. For example, at the first site (see 201), host-A 110A supports VM1 131 and VM3 133, and host-B 110B supports EDGE1 150 and VM2 132. Hosts 110A-B may be connected via any suitable physical network 203. At the second site (see 202), host-C 110C supports EDGE2 160 and VM4 134, and host-D 110D supports VM5 135 (not shown in FIG. 2 for simplicity). In alternative implementations, EDGE1 150 and/or EDGE2 160 may be bare metal machines or supported by different hosts than that shown in FIG. 2.

Hypervisor 112A/112B/112C maintains a mapping between underlying hardware 111A/111B/111C and virtual resources allocated to the VMs. Hardware 111A/111B/111C includes various physical components, such as central processing unit(s) or processor(s) 120A/120B/120C; memory 122A/122B/122C; physical network interface controllers (NICs) 124A/124B/124C; and storage disk(s) 128A/128B/128C accessible via storage controller(s) 126A/126B/126C, etc. Virtual resources are allocated to each virtual machine to support a guest operating system (OS) and applications, such as virtual central processing unit (CPU), guest physical memory, virtual disk(s) and virtual network interface controller (VNIC). Hypervisor 112A/112B/112C further implements virtual switch 114A/114B/114C and logical distributed router (DR) instance 116A/116B/116C to handle egress packets from, and ingress packets to, respective VMs.

In practice, logical switches and logical distributed routers may be implemented in a distributed manner and can span multiple hosts 110A-C to connect the VMs. For example, a logical switch may be configured to provide logical layer-2 connectivity to VMs supported by different hosts. The logical switch may be implemented collectively by virtual switches 114A-C of respective hosts 110A-C and represented internally using forwarding tables (e.g., 115A-C) at the respective virtual switches 114A-C. Further, logical distributed routers that provide logical layer-3 connectivity may be implemented collectively by distributed router (DR) instances (e.g., 116A-C) of respective hosts 110A-C and represented internally using routing tables (e.g., 117A-C) at the respective DR instances. Routing tables 117A-C may be each include entries that collectively implement the respective logical distributed routers.

The VMs (e.g., VMs 131-134, 150 and 160) may send and receive packets via respective logical ports 141-146. As used herein, the term "logical port" may refer generally to a port on a logical switch to which a virtualized computing instance is connected. A "logical switch" may refer generally to an SDN construct that is collectively implemented by virtual switches of hosts 110A-C, whereas a "virtual switch" (e.g., 114A-C) may refer generally to a software switch or software implementation of a physical switch. In practice, there is usually a one-to-one mapping between a logical port on a logical switch and a virtual port on a virtual switch. However, the mapping may change in some scenarios, such as when the logical port is mapped to a different virtual port on a different virtual switch after migration of the corresponding virtualized computing instance (e.g., when the source and destination hosts do not have a distributed virtual switch spanning them).

Although examples of the present disclosure refer to virtual machines, it should be understood that a "virtual machine" running on a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The virtual machines may also be complete computational environments, containing virtual equivalents of the hardware and software components of a physical computing system.

As used herein, the term "hypervisor" may refer generally to a software layer or component that supports the execution of multiple virtualized computing instances, including system-level software in guest virtual machines that supports namespace containers such as Docker, etc. Hypervisors 114A-C may each implement any suitable virtualization technology, such as VMware ESX® or ESXi™ (available from VMware, Inc.), Kernel-based Virtual Machine (KVM), etc. The term "packet" may refer generally to a group of bits that can be transported together from a source to a destination, such as message, segment, datagram, etc. The term "traffic" may refer generally to a flow of packets. The term "layer 2" may refer generally to a Media Access Control (MAC) layer; "layer 3" to a network or Internet Protocol (IP) layer; and "layer-4" to a transport layer (e.g., using transmission control protocol (TCP) or user datagram protocol (UDP)) in the Open System Interconnection (OSI) model, although the concepts described herein may be used with other networking models.

Depending on the desired implementation, tunnel 180 may be established between a first tunnel endpoint at EDGE1 150 and a second tunnel endpoint at EDGE2 160. In practice, the second tunnel endpoint may be any other endpoint or non-edge router, not just EDGE2 160. Tunnel 180 may be established using any suitable tunneling protocol. For example, a Virtual Private Network (VPN) based on Internet Protocol Security (IPSec) may bridge traffic in a hybrid cloud environment between first site 201 (e.g., on-prem data center) and second site 202 (e.g., public cloud environment). In practice, IPSec is a secure network protocol suite that provides data authentication, integrity and confidentiality between a pair of entities (e.g., data centers, gateways) across an IP-based network. One example in the IPSec protocol suite is Encapsulating Security Payload (ESP), which provides origin authenticity using source authentication, data integrity and confidentiality through encryption protection for IP packets. Although various examples will be discussed using IPSec-based VPN, it should be understood that any alternative and/or additional protocol(s) may be used.

In the example in FIG. 1, some example cross-site packet flows are shown. A first packet flow is between VM4 134 on host-C 110C and VM1 131 on host-A 110A. A second packet flow is between VM5 135 on host-D 110D and VM2 132 on host-B 110B. At the second site, EDGE2 160 may perform transmit-side processing by performing encryption and encapsulation on packets originating from source endpoints VM4 134 and VM5 135. At the first site, EDGE1 150 may perform receive-side processing by performing decryption and decapsulation before forwarding (decrypted) packets towards destination endpoints VM1 131 and VM2 132. Conventionally, however, packet processing at EDGE1 150 may lack parallelism and efficiency. This causes a bottleneck at EDGE1 150, especially when there is a large number of packets that require receive-side processing.

Receive-Side Processing for Encapsulated Encrypted Packets

According to examples of the present disclosure, receive-side processing for encapsulated encrypted packets may be performed in a more efficient manner. In particular, post-cryptography processing may be distributed among multiple processing units of EDGE1 150 based on (cleartext) content of decrypted packets. This way, receive-side scaling (RSS) may be implemented for post-cryptography operations to improve parallelism at EDGE1 150 and therefore performance. Examples of the present disclosure should be contrasted against conventional approaches that assign packets to different processing units based on their non-encrypted outer header because the rest of the packets are encrypted.

Examples of the present disclosure may be performed by any suitable "computer system" configured to perform receive-side processing. In the following, an example "computer system" will be explained using EDGE1 150, which is deployed at the edge of first site 201 to facilitate communication among VMs 131-135. Depending on the desired implementation, EDGE1 150 may implement any suitable data-plane packet processing engine(s) to perform packet processing. One example is the Data Plane Development Kit (DPDK), which is an open-source Linux Foundation project that provides a set of data plane libraries and (physical or virtual) NIC drivers to accelerate fast packet processing.

As used herein, the term "receive-side processing" may be used generally to include various operations performed by a computer system in response to receiving ingress or incoming encapsulated encrypted packets, including authentication, decryption, decapsulation, encapsulation, firewall, load balancing, forwarding to destination, etc. To support RSS, EDGE 150 may include multiple processing units labelled as core1, . . . , coreN (see 151 in FIG. 1). Any number (N>1) of processing units may be configured. The term "processing units" or "cores" may refer generally to a set of components capable of supporting parallel processing. Each "processing unit" or "core" may be hardware-implemented (e.g., processors, CPU cores) and/or software-implemented (e.g., threads executed in parallel, virtual CPUs). Using DPDK (see FIG. 4), poll mode driver (PMD) threads may run on top of processing units 151.

Figure 3:
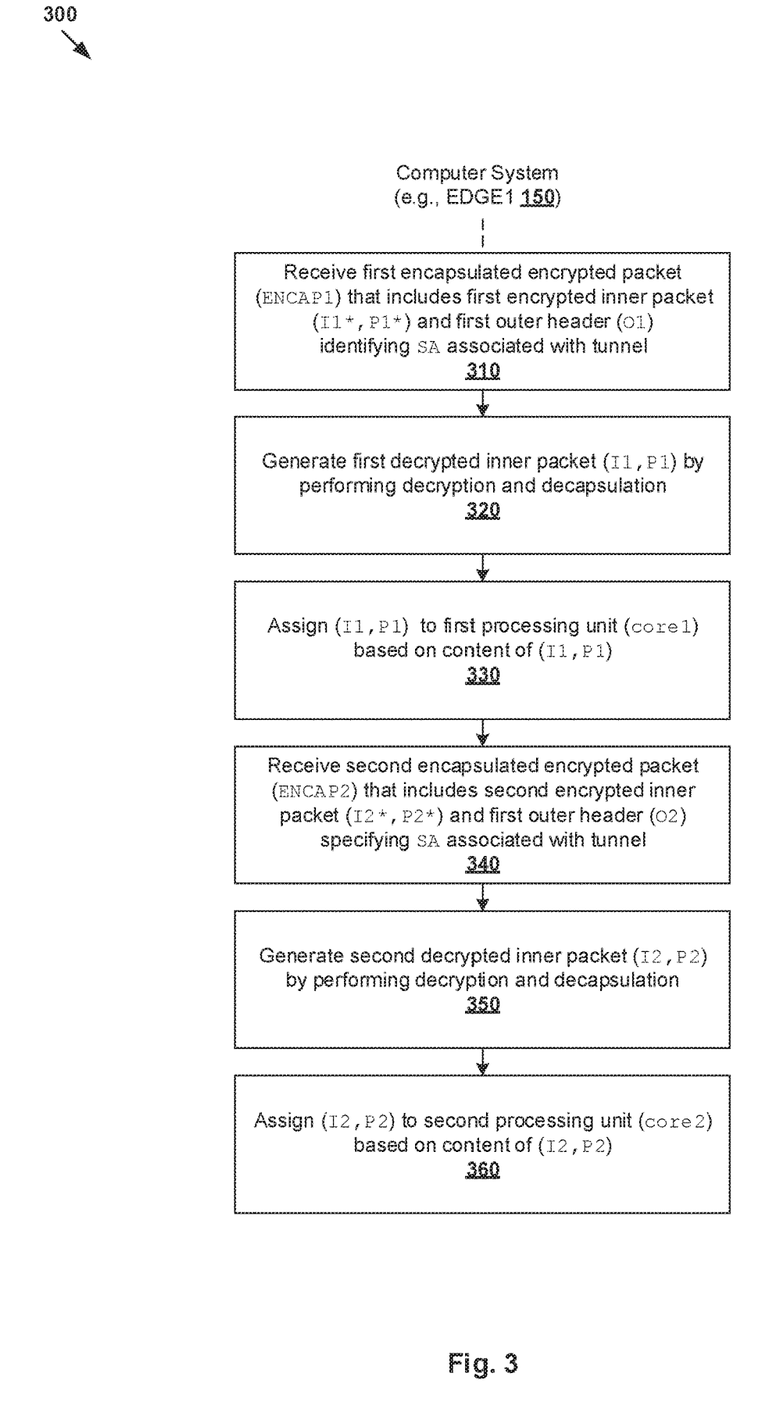
FIG. 3 is a flowchart of an example process for a network device to perform receive-side processing for encapsulated encrypted packets.

In more detail, FIG. 3 is a flowchart of example process 300 for a computer system to perform receive-side processing for encapsulated encrypted packets. Example process 300 may include one or more operations, functions, or actions illustrated by one or more blocks, such as 310 to 360. The various blocks may be combined into fewer blocks, divided into additional blocks, and/or eliminated depending on the desired implementation. In the following, example process 300 will be explained using the example packet flows in FIG. 1. Throughout the present disclosure, an asterisk (*) is used to indicate encrypted packet content, such as encrypted header (e.g., I1* and I2*) and encrypted payload (e.g., P1* and P2*). The absence of the asterisk (e.g., O1, I1, P1) indicates decrypted or cleartext packet content.

At 310 and 320 in FIG. 3, in response to receiving a first encapsulated encrypted packet (see ENCAP1 102) over tunnel 180, EDGE1 150 may perform decryption and decapsulation on the first encapsulated encrypted packet. Using the example in FIG. 1, ENCAP1 102 includes a first outer header (O1) and a first encrypted inner packet (I1*, P1*), where I1*=encrypted inner header, and P1*=encrypted payload. Block 320 may involve decapsulation to remove the first outer header (O1) and decryption to generate a first decrypted inner packet (I1, P1), thereby extracting the same inner packet content that is encrypted by EDGE2 160. Block 320 may also include authentication and other receive-side processing operation(s). At 330 in FIG. 3, EDGE1 150 may assign the first encrypted inner packet (I1, P1) to a first processing unit (e.g., core1) of EDGE1 150 based on (cleartext) content of the first encrypted inner packet. See 101-104 in FIG. 1.

At 340 and 350 in FIG. 3, in response to receiving a second encapsulated encrypted packet (see ENCAP2 106) over tunnel 180, EDGE1 150 may perform decryption and decapsulation. Using the example in FIG. 1, ENCAP2 106 includes a second outer header (O2) and a second encrypted inner packet (I2*, P2*), where I2*=encrypted inner header and P2*=encrypted payload. Block 350 may involve decapsulation to remove the second outer header (O2) and decryption to generate a second decrypted inner packet (I2, P2), thereby extracting the same inner packet content that is encrypted by EDGE2 160. Block 350 may also include authentication and other receive-side processing operation(s). At 350 in FIG. 3, EDGE1 150 may assign the second encrypted inner packet to a second processing unit (e.g., core2) based on content of the second encrypted inner packet. This way, post-cryptography (e.g., post-decryption) processing may be distributed among multiple processing units based on (cleartext) content of decrypted inner packets before they are forwarded towards their respective destinations. See 105-108 in FIG. 1.

As will be described using FIGS. 4, 5 and 6, post-cryptography RSS may be performed for encapsulated encrypted packets (e.g., ENCAP1 102 and ENCAP2 106) belonging to a single security association (SA). In practice, the term "security association" may refer generally to a form of contract between a pair of tunnel endpoints (e.g., implemented by respective EDGE1 150 and EDGE2 160) detailing how to exchange and protect information exchange between them. By implementing post-cryptography RSS for a particular SA, network performance may be improved in scenarios where only one SA is negotiated per tunnel 180. In practice, route-based VPN that has high throughput may lead to such configuration. Otherwise, endpoints may experience performance degradation over a single SA, especially when various stateful services (e.g., firewall) are enabled in addition to VPN.

As will be described using FIGS. 4, 5 and 6, blocks 330 and 360 may involve any suitable assignment strategy. In one example, the first processing unit may be selected at block 330 based on header information (I1) of the first decrypted inner packet. Similarly, the second processing unit may be selected at block 360 based on header information (I2) of the second decrypted inner packet. The header information (e.g., 5 or 10 tuples) may include source address information, destination address information, source port number, destination port number and protocol information. This way, packets belonging to a particular flow may be assigned to the same processing unit. In another example, a load-based approach may be used to select the first processing unit based on the decrypted header information and a load level associated with the first processing unit to further improve resource utilization.

Example Architecture

Figure 4:
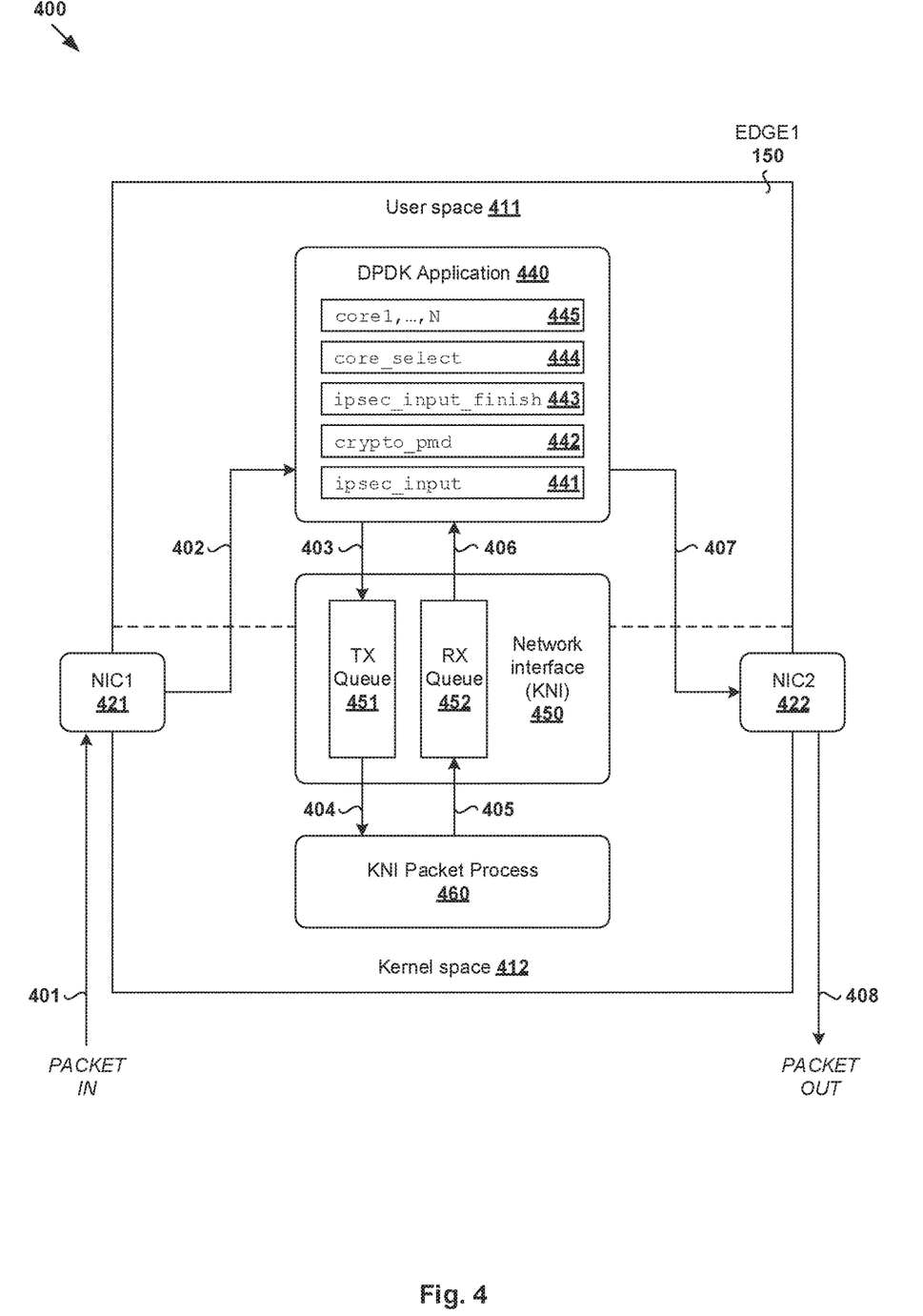
FIG. 4 is a schematic diagram illustrating an example architecture of a computer system configured to perform receive-side processing for encapsulated encrypted packets.

FIG. 4 is a schematic diagram illustrating example architecture 400 of network device 150 configured to perform receive-side processing for encapsulated encrypted packets in SDN environment 100. Example architecture 400 may include additional and/or alternative components than that shown in FIG. 4. In the example in FIG. 4, EDGE1 150 may support any suitable packet processing engines, such as DPDK application 440 residing in user space 411 and kernel NIC interface (KNI) packet process 460 residing in kernel space 412. Packets that travel between user-space DPDK application 440 and KNI packet process 460 is handled by network interface 450 (e.g., KNI). Network interface 450 supports transmit (TX) and receive (RX) queues 451-452, which may be shared-memory-based queues that are accessible by both DPDK application 440 and KNI packet process 460.

Packet processing by EDGE1 150 will be explained using 401-408. At 401-402, in response to detecting a packet at first NIC1 421, the packet may be directed to DPDK application 440 in user space 411. At 407, after performing any necessary packet processing, DPDK application 440 may direct the processed packet towards second NIC2 422. Alternatively, at 403, DPDK application 440 may direct the packet to network interface 450 via TX queue 451. In this case, at 404-405, KNI packet process 460 may retrieve (e.g., poll) packet(s) from TX queue 451 before performing any necessary packet processing and pushing the packet(s) into RX queue 452 of network interface 450. At 406, DPDK application 440 may retrieve (e.g., poll) packet(s) from RX queue for any necessary packet processing. At 407-408, DPDK application 440 may perform necessary processing and forward packet(s) to second NIC2 422. It should be noted that a particular ingress packet (e.g., "PACKET IN" 401) is not necessarily the same as an egress packet (e.g., "PACKET OUT" 408) in FIG. 4.

To support post-cryptography RSS, a receive-side datapath on DPDK application 440 may include various components 441-444 (to be explained below) and multiple processing units 445 denoted as core1, . . . , coreN (see also 151 in FIG. 1). Packets polled from NIC1 421 (see 402) may be processed by DPDK application 440 using components 441-444 before the packets are directed towards second NIC2 422. It is not necessary to perform post-cryptography RSS on packets that are polled from RX queue 452 on KNI 450 (see 406). To facilitate post-cryptography RSS, it should be understood that DPDK application 440 may implement any alternative and/or additional components (or sub-components) than that shown in FIG. 4. Depending on the desired implementation, example components 441-445 may have any suitable function names.

IPSec-Based VPN Example

Examples of the present disclosure will now be explained using IPSec-based VPN. It should be understood that any alternative and/or additional protocol(s) may be used. In more detail, FIG. 5 is a flowchart of example detailed process 500 for a network device to perform receive-side processing for encapsulated encrypted packets in SDN environment 100. Example process 500 may include one or more operations, functions, or actions illustrated by one or more blocks, such as 510 to 580. The various blocks may be combined into fewer blocks, divided into additional blocks, and/or eliminated depending on the desired implementation. The example in FIG. 5 will be explained using FIG. 6, which is a schematic diagram illustrating example receive-side processing 600 for encapsulated encrypted packets according to the example in FIG. 5.

(a) Tunnel Establishment

Figure 5:
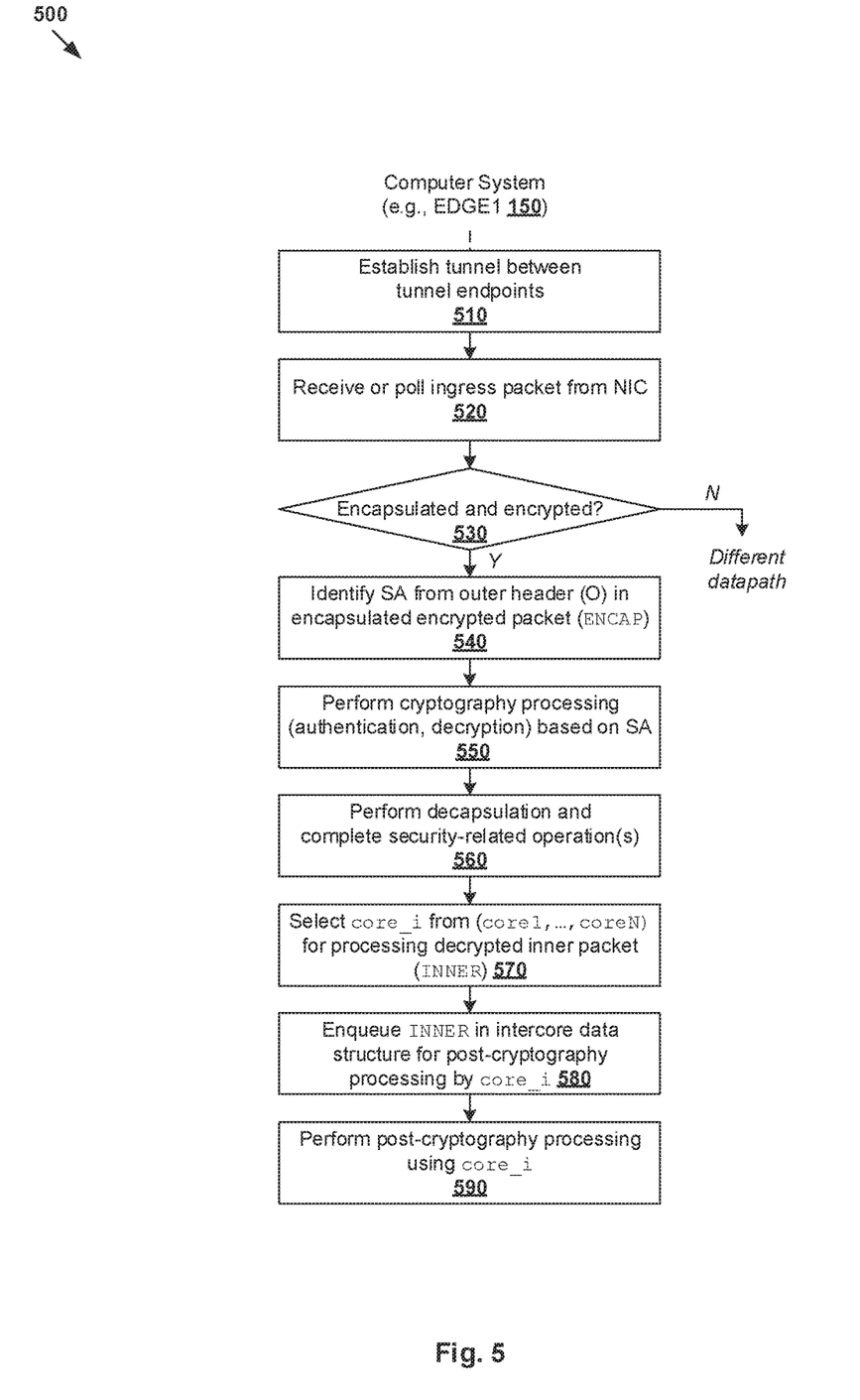
FIG. 5 is a flowchart of an example detailed process for receive-side processing for encapsulated encrypted packets.

At 510 in FIG. 5, tunnel 180 may be established between a first tunnel endpoint at EDGE1 150 and a second tunnel endpoint at EDGE2 160 to facilitate secure communication between them. During tunnel establishment, EDGE1 150 and EDGE2 160 may establish or negotiate an SA associated with tunnel 180 to specify various security attributes, such as cryptographic algorithms and keys. For example, EDGE1 150 and EDGE2 160 may negotiate which algorithms to encrypt packets and to check for data integrity, such as advanced encryption standard (AES), secure hash algorithm (SHA), AES Galois/Counter mode (AES-GCM), etc. The SA may be established manually (where tunnel attributes are static) or dynamically (where tunnel attributes are negotiated in real time).

Using IPSec for example, an SA may be uniquely identifiable using a security parameter index (SPI), source and destination address information, and a security protocol such as Encapsulating Security Payload (ESP) or Authentication Header (AH). Based on the SA, EDGE2 160 may perform encryption and encapsulation for egress packets originating from source endpoints (e.g., VM4 134 and VM5 135) before forwarding encapsulated encrypted packets over tunnel 180. At the receive-side, the reverse is performed. Based on the SA, EDGE1 150 to perform decryption and decapsulation before forwarding decrypted packets towards destination endpoints (e.g., VM1 131 and VM2 132). To identify the SA, an associated SPI may be added an identification tag to an outer header of each encapsulated encrypted packet travelling over tunnel 180. Although not shown for simplicity, each encapsulated encrypted packet may be padded with encryption-related data, such as ESP trailer data and ESP authentication data before being sent over tunnel 180.

(b) Decryption and Decapsulation

At 520 and 530 in FIG. 5, DPDK application 440 may receive (e.g., by polling) ingress packets from NIC1 421 and determine whether they require decryption and decapsulation. If not (e.g., non-IPSec packets), a different datapath may be used to process the ingress packets. In the example in FIG. 6, three example encapsulated encrypted packets are shown, i.e., labelled as ENCAP1 (see 611), ENCAP2 (see 612) and ENCAP3 (see 613). Each encapsulated encrypted packet 611/612/613 includes an outer header (O1, O2, O3) that is addressed from source tunnel endpoint address=IP-TEP2 associated with EDGE2 160 to destination tunnel endpoint address=IP-TEP1 associated with EDGE1 150. The outer header (O1, O2, O3) also specifies SPI=X that identifies a particular SA negotiated for tunnel 180. See 601, 603 in FIG. 6.

ENCAP1 611, ENCAP2 612 and ENCAP3 613 include respective encrypted inner packets denoted as (I1*, P1*), (I2*, P2*) and (I3*, P3*). For ENCAP1 611 and ENCAP3 613, their respective encrypted inner packets (I1*, P1*) and (I3*, P3*) are addressed from source address=IP-VM4 associated with VM4 134 to destination address=IP-VM1 associated with VM1 131. For ENCAP2 612, encrypted inner packets (I2*, P2*) is addressed from source address=IP-VM5 associated with VM5 135 to destination address=IP-VM2 associated with VM2 132. In other words, ENCAP1 611, ENCAP2 612 and ENCAP3 613 belong to the same SA (i.e., SPI=X), but two different packet flows. See 602, 604 in FIG. 6.

At 540, 550 and 560, DPDK application 440 may perform receive-side processing for ENCAP1 611, ENCAP2 612 and ENCAP3 613, such as decapsulation, decryption, authentication, etc. Using IPSec as an example, DPDK application 440 may implement various modules for processing ENCAP1 611, ENCAP2 612 and ENCAP3 613, including "ipsec_input" 441, "crypto_pmd" 442 and "ipsec_input_finish" 443. In this case, block 540 may involve "ipsec_input" 441 parsing the outer header (O1, O2, O3) of ENCAP1 611, ENCAP2 612 and ENCAP3 613 to identify an SA associated with SPI=X, and preparing any necessary transactions for a cryptography driver.

At 550 in FIG. 5, DPDK application 440 may perform cryptography operations using "crypto_pmd" 442, such as authentication (e.g., based on MAC computation) and decryption to convert an encrypted inner packet to a decrypted inner packet. In the example in FIG. 6, ENCAP1 611, ENCAP2 612 and ENCAP3 613 may be transformed into respective decrypted packets denoted as DECRYPT1 621, DECRYPT2 622 and DECRYPT3 623. Note that DECRYPT1 621 includes a decrypted inner packet denoted as (I1, P1), DECRYPT2 622 includes (I2, P2) and DECRYPT3 623 includes (I3, P3).

At 560 in FIG. 5, DPDK application 440 may perform decapsulation to remove the outer headers (O1, O2, O3) using "ipsec_input_finish" 443. The results are denoted as INNER1 631, INNER2 632 and INNER3 633 in FIG. 6. Block 550 may also involve completing various IPSec processing, such as checking a replay window, etc. In practice, any other packet information (header or trailer) not shown in FIG. 6 may be removed before being forwarded towards the destination. Using Generic Route Encapsulation (GRE) over IPSec as an example, GRE-related headers may be removed, such as a GRE header, etc. The GRE header is generally encrypted when sent over tunnel 180.

(c) Post-Cryptography RSS

At 570 in FIG. 5, DPDK application 440 may distribute post-cryptography processing over multiple processing units using "core_select" 444. Block 570 may involve selecting a particular core_i from the set of [core1, . . . , coreN] based on cleartext or decrypted content of INNER1 631, INNER2 632 and INNER3 633. Any suitable assignment or core selection approach may be used, such as tuple-based, load-based, etc. To reduce the amount of CPU time spent on dispatching packets to various processing units, it is not necessary to implement the same complex RSS algorithms used by hardware NICs. In practice, calculating RSS in software is generally very costly, and examples of the present disclosure may be used together with any suitable inner flow hashing approach for distributing (decrypted) inner packets among processing units 445.

Using a tuple-based approach, block 570 may involve parsing the decrypted inner header to extract tuple information and calculating a hash value associated with the tuple information to select core1 based on the hash value. One example is to map the tuple information to a particular processing core by applying an exclusive OR (XOR) operation as follows:

$$i = \text{XOR of tuple modulo } N.$$

Here, $i \in \{1, \ldots, N\}$ represents an index of the selected processing unit, N represents the total number of available processing units and tuple represents 5-tuple=(source IP address, destination IP address, source port number, destination port number, protocol) extractable from the decrypted inner header (I1, I2, I3).

Figure 6:
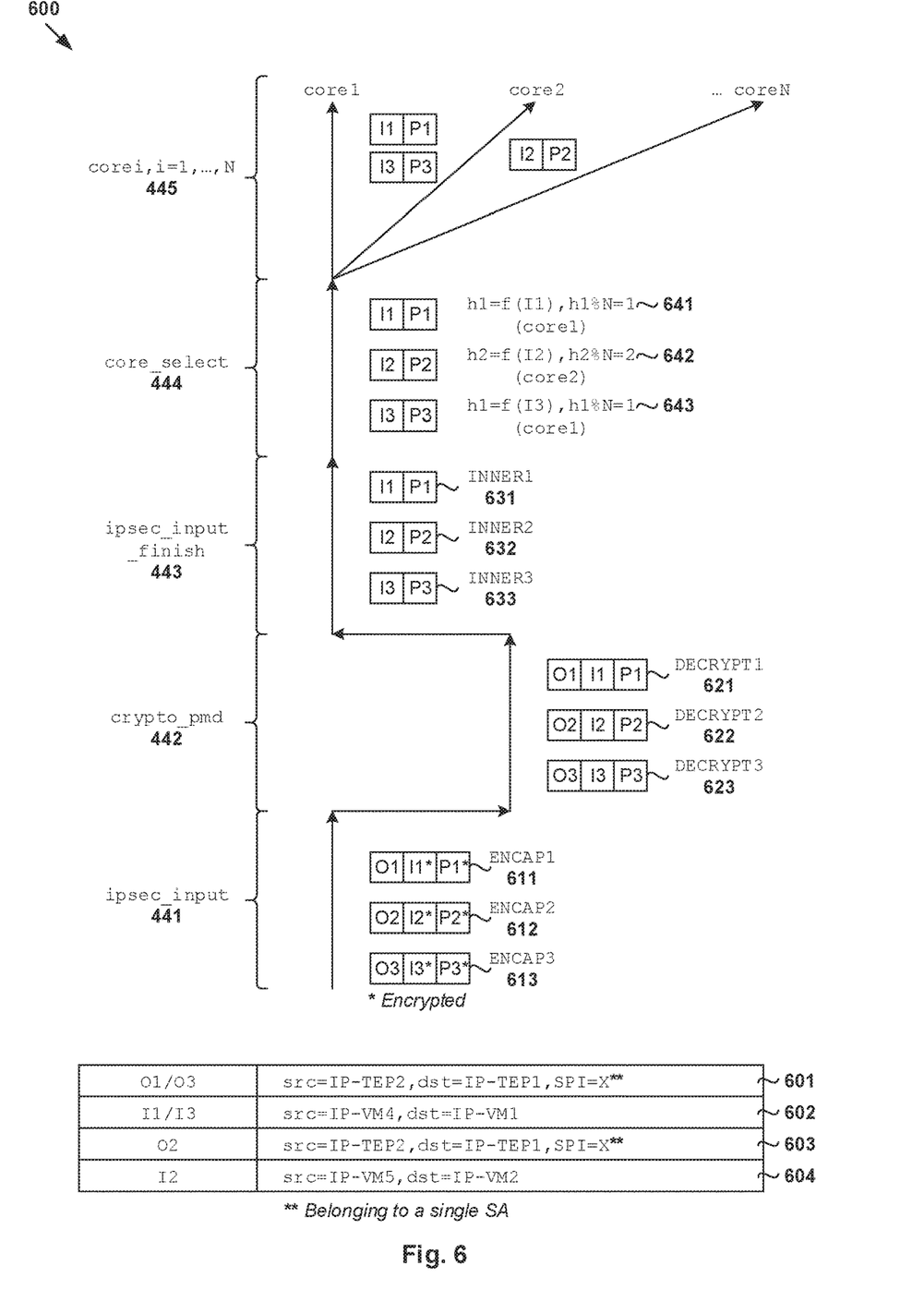
FIG. 6 is a schematic diagram illustrating an example of receive-side processing for encapsulated encrypted packets according to the example in FIG. 5.

In the example in FIG. 6, INNER1 631 and INNER3 633 are both assigned to the same core1 based on a first hash value (h1) associated with a TCP flow between VM4 134 and VM1 131. INNER2 632 may be assigned to core2 based on a second hash value (h2) associated with a TCP flow between VM5 135 and VM2 132. See 641-643 in FIG. 6. Using the tuple-based approach, packets having the same tuple information and belonging to the same TCP flow may be assigned to the same processing core. This has various performance advantages compared to a random or round robin assignment, including reducing the likelihood of out-of-order packet processing, packet loss, etc.

In another example, a load-based approach may be implemented to select core_i based on a load level associated with each corei. For example, if the load level exceeds a predetermined threshold, a different corei may be selected. Subsequent packets from the same TCP flow may be assigned to the same corei. Depending on the desired implementation, the hash value may be calculated based on additional or alternative tuple information from inner packets 631-633.

At 580 and 590 in FIG. 5, decrypted inner packet 631-633 may be enqueued for subsequent post-cryptography processing by their selected corei. For example, an intercore data structure (e.g., a ring, buffer, etc.) may be configured to store pointers to respective decrypted inner packets 631-633 before they are processed by respective core1 and core2. In this case, processing units 445 may poll packets from the intercore data structure for further processing. In practice, each corei may be a PMD thread configured to perform post-cryptography processing, such as to provide routing, firewall, policy-based routing, NAT and/or other networking service(s). If flow cache is enabled on EDGE1 150, a match-action type of processing may be implemented. This involves performing a lookup in a flow cache table and, if there is a match, the associated action(s). Once post-cryptography processing is completed, INNER1 631 and INNER3 633 may be forwarded by EDGE1 150 towards destination VM1 131 on host-A 110A, and INNER2 632 towards destination VM2 132 on host-B 110B.

Using examples of the present disclosure, RSS may be performed for packets belonging to the same SA, but different packet flows. This allows scaling of IPSec performance for a particular SA supported by tunnel 180, such as in the case of route-based VPN. This should be contrasted against conventional approaches that are able to distribute traffic based on non-encrypted content of the outer header, such as the SPI. By performing load balancing or core selection based on decrypted content of packets, post-cryptography processing may be distributed more efficiently among multiple processing units 445 at EDGE1 150. Although explained using EDGE1 150, it should be understood that EDGE2 160 may implement the examples of the present disclosure to perform receive-side processing for encapsulated encrypted packets on the reverse path, such as from VM1 131 to VM4 134 or from VM2 132 to VM5 135.

Examples of the present disclosure may be implemented for tunnel 180 supporting multiple SAs. Using an example with two SAs, different packet flows belonging to a first SA may be distributed among a first subset of processing units 445, such as core1, . . . , coreM, where M<N. Additionally, different packet flows belong to a second SA may be distributed among a second subset of processing units 445, such as core(M+1), . . . , coreN. The size of the first subset (M) may be configured according to a priority level associated with the first SA. For example, more processing units may be allocated to the first SA to assign a higher priority level compared to the second SA.

Container Implementation

Although discussed using VMs 131-135, it should be understood that receive-side processing for encapsulated encrypted packets may be performed for other virtualized computing instances, such as containers, etc. The term "container" (also known as "container instance") is used generally to describe an application that is encapsulated with all its dependencies (e.g., binaries, libraries, etc.). For example, multiple containers may be executed as isolated processes inside VM1 131, where a different VNIC is configured for each container. Each container is "OS-less", meaning that it does not include any OS that could weigh 10s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. Using the examples in FIG. 1 to FIG. 6, receive-side processing for encapsulated encrypted packets may be performed to facilitate secure communication among containers located at geographically-dispersed sites in SDN environment 100.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 6. For example, a computer system capable of acting as EDGE1 150 or EDGE2 160 may be deployed in SDN environment 100 to perform receive-side processing.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described or can be alternatively located in one or more devices different from that in the examples. The units in the examples described can be combined into one module or further divided into a plurality of sub-units.

We claim:

1. A method for a computer system to perform receive-side processing for encapsulated encrypted packets, the method comprising:
   in response to receiving, over a tunnel, a first encapsulated encrypted packet that includes a first encrypted inner packet and a first outer header:
      generating a first decrypted inner packet by performing decryption on the first encrypted inner packet and decapsulation to remove the first outer header; and
      based on header content of the first decrypted inner packet, assigning the first decrypted inner packet to a first processing unit; and
   in response to receiving, over the tunnel, a second encapsulated encrypted packet that includes a second encrypted inner packet and a second outer header:
      generating a second decrypted inner packet by performing decryption on the second encrypted inner packet and decapsulation to remove the second outer header; and
      based on header content of the second decrypted inner packet, assigning the second decrypted inner packet to a second processing unit, thereby distributing post-cryptography processing over multiple processing units that include the first processing unit and second processing unit,
   wherein assigning the first decrypted inner packet to the first processing unit and assigning the second decrypted inner packet to the second processing unit, respectively based on the header contents of the first and second decrypted inner packets, comprise using a hash value associated with tuple information so that packets having same tuple information and belonging to a same transmission control protocol (TCP) flow between a source and a destination are assigned to a same processing unit.

2. The method of claim 1, wherein generating the first decrypted inner packet comprises:
   performing decryption on the first encrypted inner packet based on a security association (SA) associated with the tunnel and identified by the first outer header, wherein the second outer header identifies the same SA.

3. The method of claim 1, wherein assigning the first decrypted inner packet to the first processing unit comprises:
   selecting, by the computer system which comprises an edge, from the multiple processing units, the first processing unit based on the header content of the first decrypted inner packet.

4. The method of claim 3, wherein assigning the first decrypted inner packet to the first processing unit comprises:
   calculating the hash value based on the header content which includes one or more of: source address information, destination address information, source port number, destination port number, and protocol information; and
   selecting the first processing unit based on the hash value.

5. The method of claim 3, wherein assigning the first decrypted inner packet to the first processing unit further comprises:
   selecting, from the multiple processing units, the first processing unit based on a load level associated with the first processing unit.

6. The method of claim 1, wherein assigning the first decrypted inner packet and the second decrypted inner packet comprises:
   assigning the first decrypted inner packet to the first processing unit running a first poll mode driver (PMD) thread for post-cryptography processing; and
   assigning the second decrypted inner packet to the second processing unit running a second PMD thread for post-cryptography processing.

7. The method of claim 1, further comprising:
   performing, using the first processing unit, post-cryptography processing on the first decrypted inner packet to forward the first decrypted inner packet towards a first destination; and
   performing, using the second processing unit, post-cryptography processing on the second decrypted inner packet to forward the second decrypted inner packet towards a second destination.

8. A non-transitory computer-readable storage medium that includes a set of instructions which, in response to execution by a processor of a network device, cause the processor to perform a method of receive-side processing for encapsulated encrypted packets, wherein the method comprises:
   in response to receiving, over a tunnel, a first encapsulated encrypted packet that includes a first encrypted inner packet and a first outer header:

generating a first decrypted inner packet by performing decryption on the first encrypted inner packet and decapsulation to remove the first outer header; and based on header content of the first decrypted inner packet, assigning the first decrypted inner packet to a first processing unit; and in response to receiving, over the tunnel, a second encapsulated encrypted packet that includes a second encrypted inner packet and a second outer header:

generating a second decrypted inner packet by performing decryption on the second encrypted inner packet and decapsulation to remove the second outer header; and based on header content of the second decrypted inner packet, assigning the second decrypted inner packet to a second processing unit, thereby distributing post-cryptography processing over multiple processing units that include the first processing unit and second processing unit, wherein assigning the first decrypted inner packet to the first processing unit and assigning the second decrypted inner packet to the second processing unit, respectively based on the header contents of the first and second decrypted inner packets, comprise using a hash value associated with tuple information so that packets having same tuple information and belonging to a same transmission control protocol (TCP) flow between a source and a destination are assigned to a same processing unit.

9. The non-transitory computer-readable storage medium of claim 8, wherein generating the first decrypted inner packet comprises:

performing decryption on the first encrypted inner packet based on a security association (SA) associated with the tunnel and identified by the first outer header, wherein the second outer header identifies the same SA.

10. The non-transitory computer-readable storage medium of claim 8, wherein assigning the first decrypted inner packet to the first processing unit comprises:

selecting, by the network device which comprises an edge, from the multiple processing units, the first processing unit based on the header content of the first decrypted inner packet.

11. The non-transitory computer-readable storage medium of claim 10, wherein assigning the first decrypted inner packet to the first processing unit comprises:

calculating the hash value based on the header content which includes one or more of: source address information, destination address information, source port number, destination port number, and protocol information; and selecting the first processing unit based on the hash value.

12. The non-transitory computer-readable storage medium of claim 10, wherein assigning the first decrypted inner packet to the first processing unit further comprises:

selecting, from the multiple processing units, the first processing unit based on a load level associated with the first processing unit.

13. The non-transitory computer-readable storage medium of claim 8, wherein assigning the first decrypted inner packet and the second decrypted inner packet comprises:

assigning the first decrypted inner packet to the first processing unit running a first poll mode driver (PMD) thread for post-cryptography processing; and assigning the second decrypted inner packet to the second processing unit running a second PMD thread for post-cryptography processing.

14. The non-transitory computer-readable storage medium of claim 8, wherein the method further comprises:

performing, using the first processing unit, post-cryptography processing on the first decrypted inner packet to forward the first decrypted inner packet towards a first destination; and performing, using the second processing unit, post-cryptography processing on the second decrypted inner packet to forward the second decrypted inner packet towards a second destination.

15. A computer system configured to perform receive-side processing for encapsulated encrypted packets, the computer system comprising:

a processor that supports multiple processing units; and a non-transitory computer-readable medium having stored thereon instructions that, in response to execution by the processor, cause the processor to:

in response to receiving, over a tunnel, a first encapsulated encrypted packet that includes a first encrypted inner packet and a first outer header:

generate a first decrypted inner packet by performing decryption on the first encrypted inner packet and decapsulation to remove the first outer header; and based on header content of the first decrypted inner packet, assign the first decrypted inner packet to a first processing unit; and in response to receiving, over the tunnel, a second encapsulated encrypted packet that includes a second encrypted inner packet and a second outer header:

generate a second decrypted inner packet by performing decryption on the second encrypted inner packet and decapsulation to remove the second outer header; and based on header content of the second decrypted inner packet, assign the second decrypted inner packet to a second processing unit, thereby distributing post-cryptography processing over multiple processing units that include the first processing unit and second processing unit, wherein the instructions that cause the processor to assign the first decrypted inner packet to the first processing unit and to assign the second decrypted inner packet to the second processing unit, respectively based on the header contents of the first and second decrypted inner packets, comprise instructions that cause the processor to use a hash value associated with tuple information so that packets having same tuple information and belonging to a same transmission control protocol (TCP) flow between a source and a destination are assigned to a same processing unit.

16. The computer system of claim 15, wherein the instructions that cause the processor to generate the first decrypted inner packet cause the processor to:

perform decryption on the first encrypted inner packet based on a security association (SA) associated with the tunnel and identified by the first outer header, wherein the second outer header identifies the same SA.

17. The computer system of claim 15, wherein the instructions that cause the processor to assign the first decrypted inner packet to the first processing unit cause the processor to:

select, by the computer system which comprises an edge, from the multiple processing units, the first processing unit based on the header content of the first decrypted inner packet.

18. The computer system of claim 17, wherein the instructions that cause the processor to assign the first decrypted inner packet to the first processing unit cause the processor to:
    calculate the hash value based on the header content which includes one or more of: source address information, destination address information, source port number, destination port number, and protocol information; and
    select the first processing unit based on the hash value.

19. The computer system of claim 17, wherein the instructions that cause the processor to assign the first decrypted inner packet to the first processing unit further cause the processor to:
    select, from the multiple processing units, the first processing unit based on a load level associated with the first processing unit.

20. The computer system of claim 15, wherein the instructions that cause the processor to assign the first decrypted inner packet and the second decrypted inner packet cause the processor to:
    assign the first decrypted inner packet to the first processing unit running a first poll mode driver (PMD) thread for post-cryptography processing; and
    assign the second decrypted inner packet to the second processing unit running a second PMD thread for post-cryptography processing.

21. The computer system of claim 15, wherein the instructions further cause the processor to:
    perform, using the first processing unit, post-cryptography processing on the first decrypted inner packet to forward the first decrypted inner packet towards a first destination; and
    perform, using the second processing unit, post-cryptography processing on the second decrypted inner packet to forward the second decrypted inner packet towards a second destination.

* * * * *